United States Patent [19]
Kovacs

[11] Patent Number: 5,925,816
[45] Date of Patent: Jul. 20, 1999

[54] APPARATUS FOR TESTING WATERTIGHTNESS OF A RAILCAR

[75] Inventor: Paul Kovacs, Trenton, N.J.

[73] Assignee: ABB Traction Inc., Elmira Heights, N.Y.

[21] Appl. No.: 08/994,491

[22] Filed: Dec. 19, 1997

Related U.S. Application Data

[63] Continuation of application No. 08/927,856, Sep. 11, 1997, Pat. No. 5,780,722, which is a continuation of application No. 08/612,166, Mar. 7, 1996, abandoned.

[51] Int. Cl.$^6$ .................................................. G01M 3/06
[52] U.S. Cl. .................................. 73/40; 73/49.2; 73/49.3
[58] Field of Search ............................. 73/40, 49.2, 49.3, 73/52

[56] References Cited

U.S. PATENT DOCUMENTS

| | | | |
|---|---|---|---|
| 2,345,387 | 3/1944 | Elsey | 73/51 |
| 4,420,969 | 12/1983 | Saum | 73/40 |
| 5,201,213 | 4/1993 | Henning | 73/49.2 |
| 5,559,282 | 9/1996 | Knight et al. | 73/40 |

FOREIGN PATENT DOCUMENTS

| | | |
|---|---|---|
| 5-10845 | 1/1993 | Japan . |
| 1661601 | 7/1991 | U.S.S.R. . |

*Primary Examiner*—Daniel S. Larkin
*Attorney, Agent, or Firm*—Webb Ziesenheim Logsdon Orkin & Hanson, P.C.

[57] ABSTRACT

An apparatus for testing watertightness of a railcar comprises a blower fan apparatus with an exhaust duct and an exhaust outlet that can be sealed against an aperture in the railcar. The fan blower of the apparatus is capable of providing an airflow to the railcar to provide a pressure differential of between about 0.5 to about 2.5 inches of $H_2O$ between an interior of the railcar and an exterior of the railcar. The blower is operated to provide air to the railcar to provide a pressure differential, causing bubbles to form in a liquid solution applied to the exterior surface of the railcar. The railcar is marked for subsequent repair at locations where bubbles are detected.

22 Claims, 3 Drawing Sheets

5,925,816

APPARATUS FOR TESTING WATERTIGHTNESS OF A RAILCAR

This application is a continuation of application Ser. No. 08/927,856, filed Sep. 11, 1997, now U.S. Pat. No. 5,780,722, which is a continuation of application Ser. No. 08/612,166, filed Mar. 7, 1996, now abandoned.

FIELD OF THE INVENTION

The present invention relates to the field of railcar maintenance, and in particular, to methods for testing for leaks in railcars to permit appropriate repair and maintenance of railcars.

BACKGROUND OF THE INVENTION

Passenger railcars, such as light rail vehicles, including commuter trains and subway trains, as well as heavy passenger railcars, will have an extremely long operating life if properly maintained. Periodic refitting and refurbishing of such railcars is typically scheduled at intervals of 10–15 years.

Water leakage in a railcar is undesirable as it can cause unsightly water marks on the interior finish panels, as well as contributing to problems of corrosion and degradation of the railcar fittings, and potentially even creating problems in the railcar's electrical systems. Such water leakage can arise in conditions of rain, or from melting snow or ice, or during washing of the railcar, if there are gaps between the seams of overlapping roof or wall sheathing panels, or other cracks or fissures in the exterior of the railcar.

The presently accepted test for watertightness of railcars involves locating the railcar in a waterspray booth (such as a car washer), where an array of nozzles sprays water on the railcar. The waterspray device is intended to simulate a rainshower. The internal walls of the railcar are then checked for leakage of water into the railcar. It should be appreciated that to detect water leakage inside the railcar that it is necessary to remove internal panels and other coverings, as well as any sound insulation beneath such coverings, that are installed in some railcars. Watertightness tests are typically performed about four times each year.

However, sometimes a watertightness test will be done without removal of the internal panels etc. In such case the testing may not disclose all leaks, and in some instances can even cause additional leaks if the testing method is merely a visual inspection of the railcar roof, since the load created by a person walking on the roof of the railcar may exceed the roof loading limit causing cracks in welds or in the roof panels themselves.

Accordingly, it would be desirable to provide a method and apparatus that permits testing of the watertightness of railcars without requiring removal of the interior finish panels and other materials, and which can be used at any time to permit a periodic check of railcar watertightness. It would also be desirable if such a method and apparatus could be performed without the need for transporting the railcar to a fixed waterspray booth.

SUMMARY OF THE INVENTION

It is an object of the present invention to provide a method and apparatus for testing watertightness of a railcar that does not require disassembly or removal of internal fittings and panels to locate leakage points.

It is an object of the present invention to provide a method and apparatus for testing watertightness of a railcar that does not require use of a waterspray booth, or a need to bring the railcar to a particular fixed location to perform such watertightness testing.

It is an object of the invention to provide a method and apparatus for testing watertightness that is adaptable for use at any time.

Accordingly, a method for testing watertightness of a railcar in accordance with the invention comprises (1) locating an air blower adjacent a railcar with an outlet of the blower sealingly located against and surrounding an aperture in the railcar; (2) applying a liquid solution, having the ability to form bubbles, to an exterior surface of the railcar; (3) operating the blower to provide air to the railcar to provide a pressure differential of from between about 0.5 to about 2.5 inches $H_2O$ between an interior of the railcar and an exterior of the railcar; (4) detecting bubbles formed in the liquid solution by escape of air from the railcar through leakage points; and (5) marking the railcar at the leakage points where the bubbles are formed by escape of air from the railcar. Preferably, the blower is operated to provide a pressure differential of between about 1.5 to about 2.5 inches $H_2O$ between the interior of the railcar and the exterior of the railcar, and most preferably, about 2.0 inches $H_2O$. The apparatus for testing watertightness in accordance with the invention comprises a fan blower having an electric motor and a blower, with an exhaust duct and an exhaust outlet; means for locating the exhaust outlet adjacent an aperture in the railcar; and means for sealing the exhaust outlet adjacent the aperture in the railcar. The fan blower of the apparatus is capable of providing an airflow to the railcar to provide a pressure differential of between about 0.5 to about 2.5 inches of $H_2O$ between an interior of the railcar and an exterior of the railcar, whereby the liquid solution having the ability to form bubbles can be applied to an exterior surface of the railcar to form detectable bubbles by escape of air from the railcar at leakage points in the railcar.

Other objects, aspects and features of the present invention in addition to those mentioned above will be pointed out in or will be understood from the following detailed description provided in conjunction with the accompanying drawings.

DETAILED DESCRIPTION OF THE DRAWINGS

Figure 1:
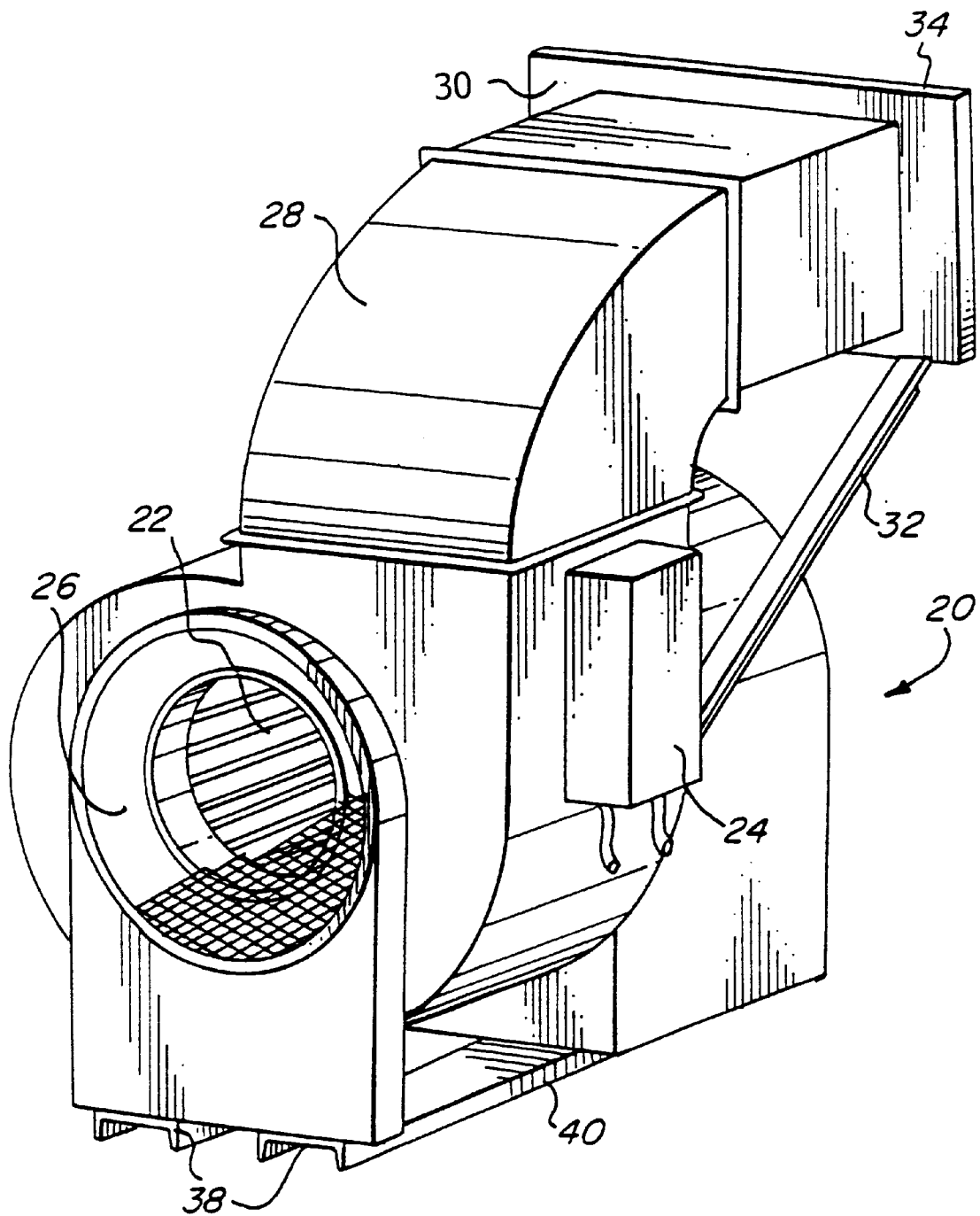
FIG. 1 is a perspective view of a watertightness testing apparatus in accordance with the invention.
Figure 2:
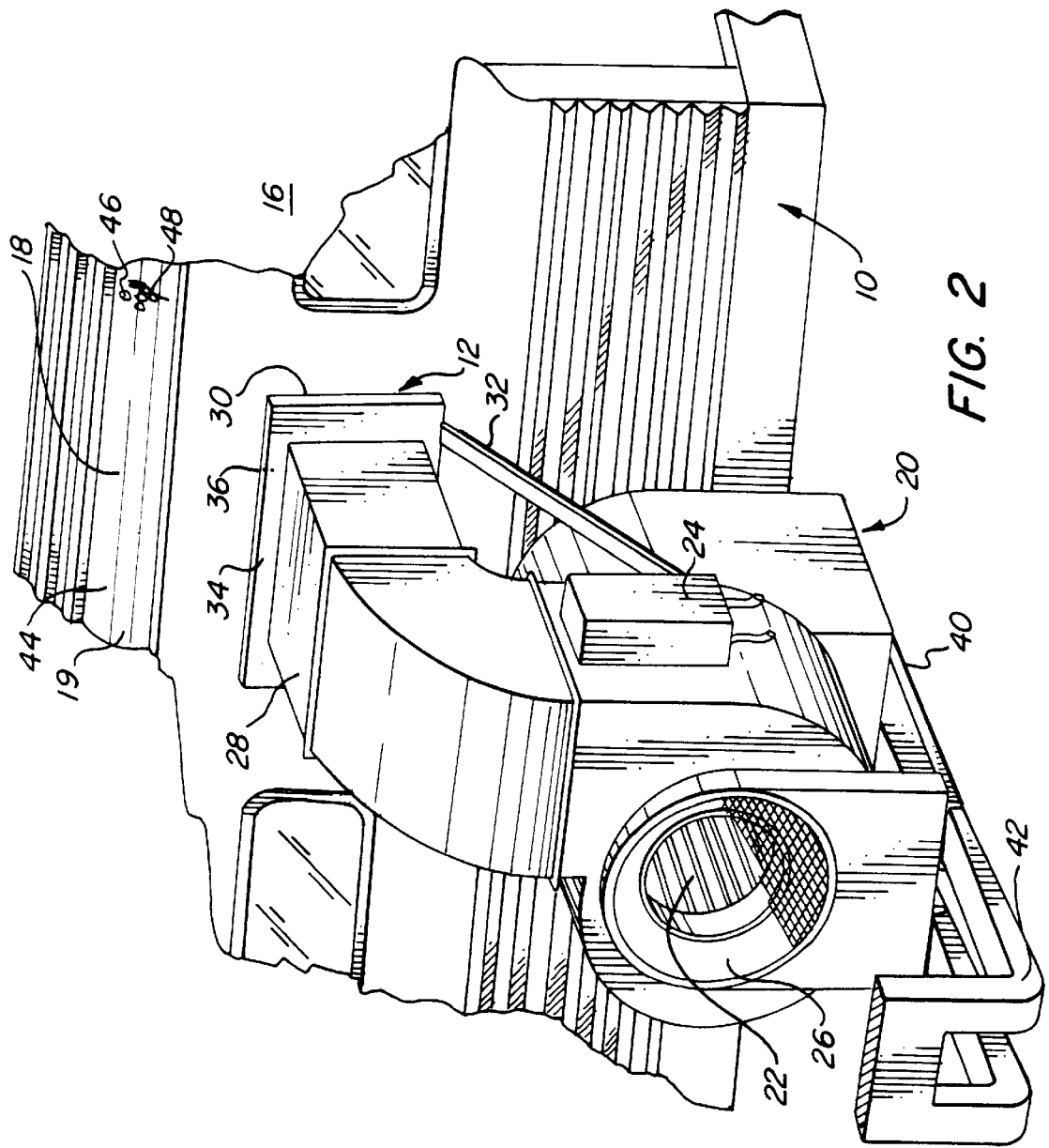
FIG. 2 is a perspective view of a watertightness testing apparatus in accordance with the invention used in the method of watertightness testing of the invention.
Figure 3:
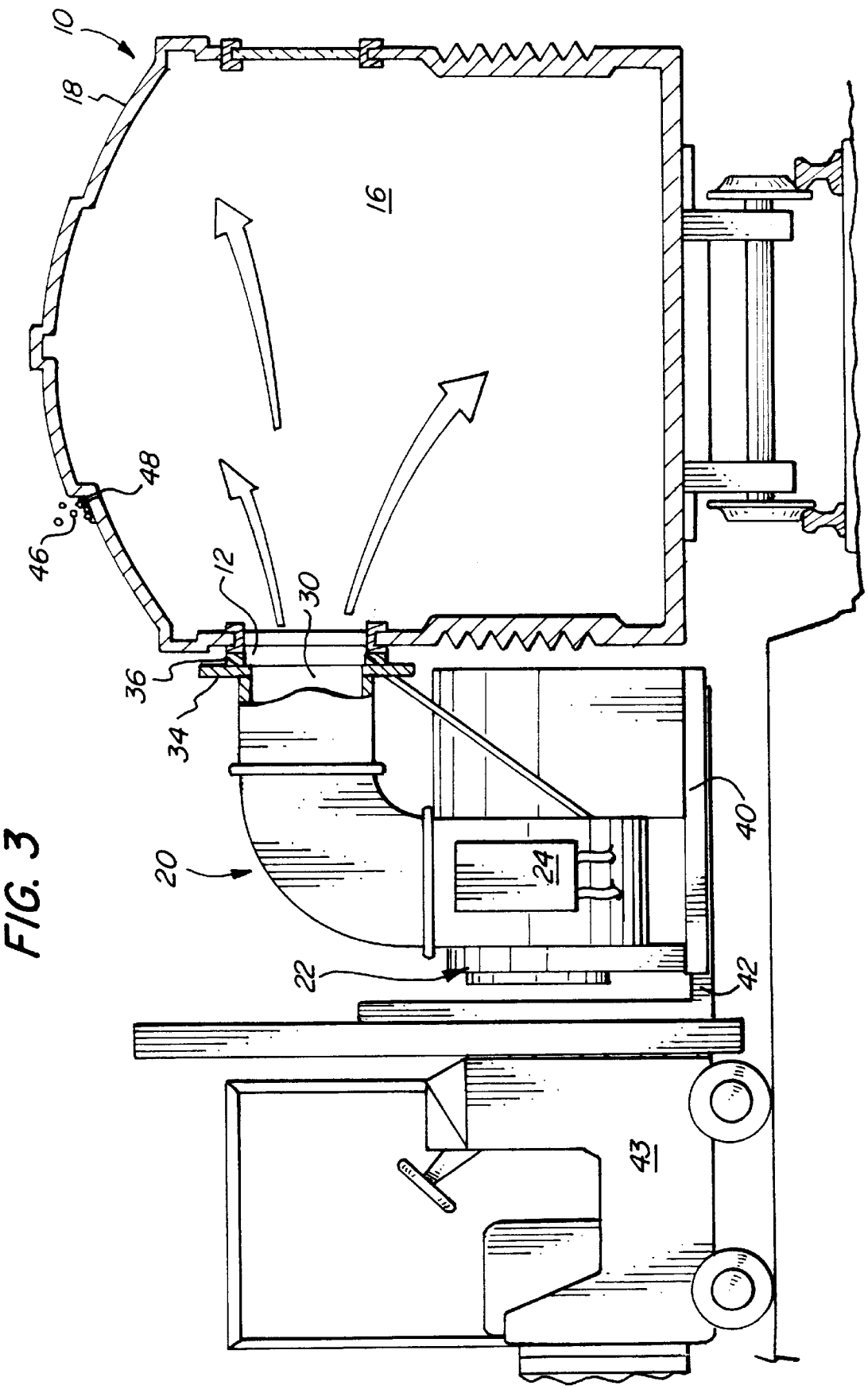
FIG. 3 is a partial side and cross-sectional view of a watertightness testing apparatus in accordance with the invention used in the method of watertightness testing of the invention.

Referring to FIGS. 1–3 in detail, apparatus 20 for testing watertightness of a railcar 10 in accordance with the invention is shown. In the Figures, the same figure numbers are used to identify like elements in the Figures.

Apparatus 20 comprises a blower fan unit 22 having a motor 24. Blower fan 22 is preferably comprises a squirrel cage blower or other conventional blower unit. Motor 24 is preferably a 480 VAC, 3 phase switched, constant speed induction motor and is directly coupled to the drive shaft of the blower fan 22. Blower 22 has an inlet 26 and an exhaust duct 28 which has a ninety degree bend to terminate in an exhaust outlet 30. Exhaust outlet 30 is positioned generally in a vertical plane, to permit the exhaust outlet 30 to be coupled to an aperture 12, preferably a window, in railcar 10. The exhaust duct 28 is preferably supported by one or more bracing struts 32 to maintain the integrity of the duct structure.

The flange 34 surrounding exhaust outlet 30 is provided with a sealing material 36 to permit the exhaust outlet 30 to be sealed against the exterior surface 19 of railcar 10 surrounding the railcar aperture 12. Sealing material 36 preferably comprises a foam gasket, most preferably a neoprene rubber foam.

The apparatus 10 is provided with means for locating the exhaust outlet 30 adjacent aperture 12 in the railcar 10. Preferably, the locating means comprises a mobile self-propelled land vehicle with a lifting apparatus for lifting the fan blower. Most preferably, the locating means comprise appropriate slots 38 in a base 40 of the apparatus 10, which allows the fork 42 of a forklift 43 to lift the apparatus 10 to place the exhaust outlet 30 adjacent aperture 12.

The apparatus 10 is capable of providing an air flow to the railcar to provide a pressure differential of between about 0.5 to about 2.5 inches of $H_2O$ between the interior 16 and the exterior 18 of the railcar 10 when the railcar doors and windows are closed. Preferably, apparatus 10 is capable of providing an airflow of 5300 cfm at a pressure differential of 1.0 inches $H_2O$ at ambient temperatures to the railcar.

The method for testing watertightness of a railcar in accordance with the invention is illustrated in FIGS. 2 and 3, and comprises use of the apparatus 10 in the following steps: (1) locating air blower apparatus 20 adjacent railcar 10 with the outlet 30 of the blower apparatus 20 sealingly located against and surrounding aperture 12 (such as a window) in the railcar 10; (2) applying a liquid solution 44, having the ability to form bubbles, to the exterior surface 19 of the railcar 10; (3) operating the blower apparatus 20 to provide air to the railcar 10 to provide a pressure differential of from between about 0.5 to about 2.5 inches $H_2O$ between the interior 16 and the exterior 18 of the railcar 10; (4) detecting bubbles 46 formed in the liquid solution 44 by escape of air from the railcar 10 through leakage points 48; and (5) marking the railcar 10 at the leakage points where the bubbles are formed by escape of air from the railcar.

Preferably, the blower 20 is operated to provide a pressure differential of between about 1.5 to about 2.5 inches $H_2O$ between the interior 16 of the railcar 10 and the exterior 18 of the railcar 10, and most preferably, to provide a pressure differential of about 2.0 inches $H_2O$.

The liquid solution may be a soap solution such as a 50/50 mixture of Murphy's Oil Soap® and water, or any other solution which will form long lasting stable bubbles. The liquid solution is preferably gently applied in a thin film over the exterior of the railcar 10, to prevent premature formation of bubbles. An effective method of applying the liquid solution to the railcar 10 is to use a sponge applicator or pouring the solution by gravity from a container. However, it would also be possible to use a hose or other power sprayer, although there may be some undesired bubbles formed.

The railcar 10 can be marked with a permanent ink marker, paint, or other visible indicators. These markings allow the subsequent repair of the leakage points to prevent water from penetrating the cabin of the railcar by a mechanic. The mechanic can use the markings as a guide to locate the leakage points for repair.

Accordingly, the present invention provides a new and effective method and apparatus for testing watertightness of a railcar. It is effective to locate leaks in the outer skin of a railcar for repair, but does not require disassembly of the internal appurtenances of the railcar.

It should be understood by those skilled in the art that obvious modifications can be made without departing from the spirit of the invention.

What is claimed is:

1. A passenger railcar in combination with apparatus for testing watertightness of said passenger railcar, said apparatus comprising:

a fan blower having an electric motor and a blower, with an exhaust duct and an exhaust outlet;

means for locating said exhaust outlet adjacent an aperture in said passenger railcar;

means for sealing said exhaust outlet adjacent said aperture in said passenger railcar;

said fan blower being capable of providing an airflow to said passenger railcar to provide a pressure differential of between about 0.5 to about 2.5 inches of $H_2O$ between an interior of said passenger railcar and an exterior of said passenger railcar;

whereby a liquid solution having the ability to form bubbles may be applied to an exterior surface of said railcar and forms detectable bubbles by escape of air from said railcar at leakage points in said passenger railcar.

2. A passenger railcar and apparatus in accordance with claim 1, said fan blower being capable of providing an air flow to said railcar to provide a pressure differential of between about 1.5 to about 2.5 inches of $H_2O$ between said interior and said exterior of said passenger railcar.

3. A passenger railcar and apparatus in accordance with claim 2, said fan blower being capable of providing an airflow to said railcar to provide a pressure differential of about 2.0 inches $H_2O$ between said interior and said exterior of said passenger railcar.

4. A passenger railcar and apparatus in accordance with claim 1, said fan blower being capable of providing an airflow of 5300 cfm at a pressure differential of 1.0 inches $H_2O$ at ambient temperatures to said passenger railcar.

5. A passenger railcar and apparatus in accordance with claim 1, wherein said means for locating said exhaust outlet comprises a mobile self-propelled land vehicle with a lifting apparatus for lifting said fan blower.

6. A passenger railcar and apparatus in accordance with claim 5, wherein said mobile self-propelled land vehicle comprises a fork lift.

7. A passenger railcar and apparatus in accordance with claim 1, wherein said fan blower comprises a constant speed motor blower.

8. A passenger railcar and apparatus in accordance with claim 1, wherein said aperture comprises a window in said passenger railcar.

9. Apparatus for testing watertightness of a passenger railcar, comprising:

a fan blower having an electric motor and a blower, with an exhaust duct and an exhaust outlet;

means for locating said exhaust outlet adjacent an aperture in said railcar;

means for sealing said exhaust outlet adjacent said aperture in said railcar;

said fan blower being capable of providing an airflow of at least 5300 cfm to said passenger railcar to provide a pressure differential of between about 1.0 to about 2.5 inches of $H_2O$ between an interior of said railcar and an exterior of said railcar although said passenger railcar may not be airtight even without any leaks, whereby a liquid solution having the ability to form bubbles may be applied to an exterior surface of said railcar and forms detectable bubbles by escape of air from said railcar at leakage points in said railcar.

10. Apparatus in accordance with claim 9, said fan blower being capable of providing an air flow to said railcar to provide a pressure differential of between about 1.5 to about 2.5 inches of $H_2O$ between said interior and said exterior of said railcar.

11. Apparatus in accordance with claim 10, said fan blower being capable of providing an airflow to said railcar to provide a pressure differential of about 2.0 inches $H_2O$ between said interior and said exterior of said railcar.

12. Apparatus in accordance with claim 9, wherein said means for locating said exhaust outlet comprises a mobile self-propelled land vehicle with a lifting apparatus for lifting said fan blower.

13. Apparatus in accordance with claim 9, wherein said mobile self-propelled land vehicle comprises a fork lift.

14. Apparatus in accordance with claim 9, wherein said fan blower comprises a constant speed motor blower.

15. Apparatus in accordance with claim 9, wherein said aperture comprises a window in said railcar.

16. A passenger railcar in combination with apparatus for testing watertightness of said passenger railcar, said apparatus comprising:

a fan blower having an electric motor and a blower, with an exhaust duct and an exhaust outlet;

means for locating said exhaust outlet adjacent an aperture in said passenger railcar;

means for sealing said exhaust outlet adjacent said aperture in said passenger railcar;

said fan blower being capable of providing an airflow of at least 5300 cfm to said passenger railcar to provide a pressure differential of between about 1.0 to about 2.5 inches of $H_2O$ between an interior of said passenger railcar and an exterior of said passenger railcar although said passenger railcar may not be airtight even without any leaks;

whereby a liquid solution having the ability to form bubbles may be applied to an exterior surface of said railcar and forms detectable bubbles by escape of air from said railcar at leakage points in said passenger railcar.

17. A passenger railcar and apparatus in accordance with claim 16, said fan blower being capable of providing an air flow to said railcar to provide a pressure differential of between about 1.5 to about 2.5 inches of $H_2O$ between said interior and said exterior of said railcar.

18. A passenger railcar and apparatus in accordance with claim 17, said fan blower being capable of providing an airflow to said railcar to provide a pressure differential of about 2.0 inches $H_2O$ between said interior and said exterior of said railcar.

19. A passenger railcar and apparatus in accordance with claim 16, wherein said means for locating said exhaust outlet comprises a mobile self-propelled land vehicle with a lifting apparatus for lifting said fan blower.

20. A passenger railcar and apparatus in accordance with claim 19, wherein said mobile self-propelled land vehicle comprises a fork lift.

21. A passenger railcar and apparatus in accordance with claim 16, wherein said fan blower comprises a constant speed motor blower.

22. A passenger railcar and apparatus in accordance with claim 16, wherein said aperture comprises a window in said railcar.

* * * * *